United States Patent [19]

Braithwaite et al.

[11] Patent Number: 5,299,557
[45] Date of Patent: Apr. 5, 1994

[54] OVEN ENCLOSURE AND VENTILATION SYSTEM

[75] Inventors: Steven D. Braithwaite, Wichita; Jerome R. Henke, Rose Hill, both of Kans.; Pete Neitzel, Rothschild, Wis.

[73] Assignee: Pizza Hut, Inc., Wichita, Kans.

[21] Appl. No.: 650,815

[22] Filed: Feb. 4, 1991

[51] Int. Cl.⁵ .................. F23J 11/00; F24C 15/20
[52] U.S. Cl. ...................... 126/299 R; 99/443 R
[58] Field of Search ............ 126/299 R, 299 D, 301, 126/302, 303, 21 R, 21 A, 80; 99/443 R, 443 C; 98/115.1, 36; 454/57, 108

[56] References Cited

U.S. PATENT DOCUMENTS

| | | | |
|---|---|---|---|
| 254,803 | 3/1882 | Cowles | 126/302 |
| 296,911 | 4/1884 | Benson | 126/302 |
| 916,699 | 3/1909 | Hahn . | |
| 1,714,823 | 5/1929 | Soper | 126/299 R |
| 2,868,108 | 1/1959 | Petersen | 98/115 |
| 4,266,529 | 5/1981 | Gaylord | 126/299 D |
| 4,332,993 | 6/1982 | Shibahara et al. | 219/10.55 R |
| 4,553,992 | 11/1985 | Boissinot et al. | 55/279 |
| 4,616,562 | 10/1986 | Kuechler | 126/299 R X |
| 4,666,478 | 5/1987 | Boissinot et al. | 55/279 |
| 4,738,243 | 4/1988 | Welsh et al. | 126/299 R |
| 4,896,657 | 1/1990 | Glassman | 126/299 D |
| 4,944,285 | 7/1990 | Glassman | 126/299 D |

OTHER PUBLICATIONS

Glassman Climate Control, Inc., "Exhaust Hood System for Restaurant & Food Service Ovens, Preliminary Data & Specifications," Brochure.

Primary Examiner—Carl D. Price
Attorney, Agent, or Firm—Willian Brinks Hofer Gilson & Lione

[57] ABSTRACT

An conveyor oven enclosure system is disclosed which includes a hood means which extends over the conveyor oven and supplies make-up air and exhausts heated air. The enclosure system includes front enclosure and rear enclosure walls which are parallel to and spaced apart from the front and rear oven walls of the oven respectively. Additionally, a first enclosure end wall is also included which is parallel to and spaced apart from the first oven end wall. A second enclosure end wall which is parallel to and spaced apart from the second oven end wall is also included. In the enclosure system of the present invention there is an entry opening in at least one of the enclosure walls which is adapted to correspond to each entry opening in the oven walls. An exit opening in at least one of the enclosure walls is provided which is adapted to correspond to each exit opening in the oven walls. The hood means enclosure, front enclosure, rear enclosure, first enclosure end, and second enclosure end walls of the present invention are configured such that make-up air passes over the front oven, rear oven, first oven end, and second oven end walls before being exhausted through the hood means.

37 Claims, 6 Drawing Sheets

OVEN ENCLOSURE AND VENTILATION SYSTEM

BACKGROUND OF THE INVENTION

The present invention relates to the field of ventilation systems for commercial ovens. More particularly, the invention relates to the field of hoods for conveyor ovens.

Figure 1:
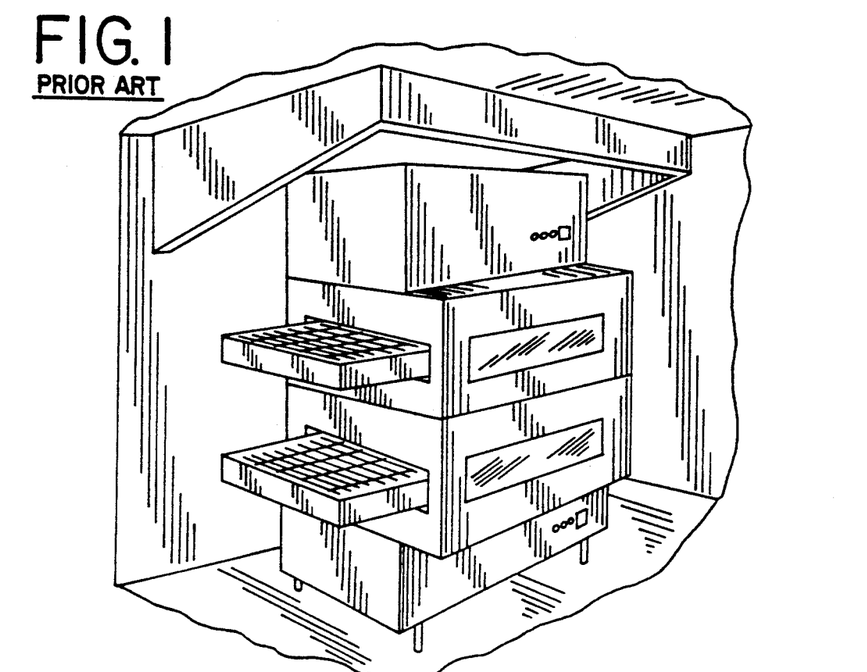
FIG. 1 is a perspective view of a prior art ventilation system.

Various types of hood arrangements have been developed to aid in the ventilation of particular commercial cooking appliances. These various ventilation systems generally mix make-up air with room air that is drawn in, circulated over the cooking surface, then exhausted. FIG. 1 illustrates a typical prior art ventilation hood arrangement above a conveyor oven.

Cooling and ventilation hoods such as the type shown in FIG. 1 capture a low percentage of the total amount of heat produced, often provide limited heat shielding and contain only a limited amount of the radiant heat given off by the oven over which the hood is located. Typically, hoods of this type include make-up and exhaust fans which often add to the noise of the oven itself. Additionally, these various ventilation systems often draw large quantities of room air to mix with the make-up air. This loss of room air increases the operating and overhead costs associated with use of the conveyor oven.

U.S. Pat. No. 4,896,657 discloses an exhaust hood for pizza ovens having a central intake plenum that directs streams of air to exhaust plenums on opposite sides.

U.S. Pat. No. 4,944,285 discloses a similar exhaust hood for pizza ovens except the hood includes a pair of intake plenums located on opposite sides which direct the flow of air toward one another in opposite directions.

U.S. Pat. No. 4,616,562 discloses a heat shield and ventilation system for a pizza oven which shrouds the front and back of a conveyor oven but leaves the ends of a conveyor oven open.

SUMMARY OF THE INVENTION

Briefly stated, the present invention is an enclosure and ventilation system for a conveyor oven. More specifically the present invention is an enclosure system for a conveyor oven where such oven has a front, and rear oven wall, and a first and second oven end wall. One of the oven walls has at least one entry opening for inserting food product onto a conveyor; and one of the oven walls has at least one exit opening for removing food product from the conveyor.

The enclosure system of the present invention includes a hood means which extends over the conveyor oven and supplies make-up air and exhausts heated air. The enclosure system includes front enclosure and rear enclosure walls which are parallel to and spaced apart from the front and rear oven walls of the oven respectively. Additionally, a first enclosure end wall is also included which is parallel to and spaced apart from the first oven end wall. A second enclosure end wall which is parallel to and spaced apart from the second oven end wall is also included.

In the enclosure system of the present invention there is at least one entry opening in one of the enclosure walls which is adapted to correspond to each entry opening in the oven walls. At least one exit opening in one of the enclosure walls is provided which is adapted to correspond to each exit opening in the oven walls. The hood means, front enclosure, rear enclosure, first enclosure end, and second enclosure end walls of the present invention are configured such that make-up air passes over the top of the oven, the front oven wall, the first oven end wall, the second oven end wall, under the oven, and over the rear oven wall before being exhausted through the hood means.

The present invention offers several advantages over the prior art. Some advantages include a reduction in the noise of operating the oven; a reduction in the temperatures of the outer surface walls of the conveyor oven; a reduction in the surface temperature of the oven control compartment; and a reduction in the draw of room air.

More particularly, when a hood system without an enclosure is used to vent a conveyor oven, the use of exhaust and make-up, or intake, fans in the hood system increase the volume of air circulated about the oven which increases the operating noises associated with operating a conveyor oven. An advantage of the present invention is that the enclosure walls of the present invention aid in minimizing the operating noises associated with a conveyor oven because the enclosure walls serve to contain and muffle sound.

Another advantage of an enclosure and ventilation system made in accordance with the present invention is all sides of the conveyor oven are enclosed which forces air to circulate around the oven and reduces the volume of room air drawn into the enclosure.

The present invention, together with its attendant objects and advantages, will be best understood with reference to the detailed description below read in conjunction with the accompanying drawings.

DETAILED DESCRIPTION OF THE PREFERRED EMBODIMENTS

The enclosure system of the present invention encloses all sides, including the ends, top and bottom, of a conveyor oven through a hood means and a series of panels. At least one entry opening and one exit opening is provided in the enclosure system which corresponds to each entry and exit opening in the conveyor oven. Preferably, access windows and/or doors are provided to permit access to all areas of the conveyor oven.

Preferably, in an enclosure system made in accordance with the present invention, untempered air is introduced through the front edge of the hood means from outside; most preferably, through at least one make-up air plenum. Preferably, this untempered air, or make-up, air is impelled to sweep down over the conveyor oven, is circulated about the oven, and is then drawn back and exhausted through the hood means. Most preferably, the make-up air is projected to sweep over the front and side oven walls and to circulate around all the oven walls, including over and under the oven. The circulated make-up air is then drawn across the rear oven wall back into the hood means through which the air is exhausted.

In accordance with the invention, the enclosure entry openings and the enclosure exit openings can be provided in either the front enclosure wall or in the enclosure end walls. Most preferably, both the enclosure entry openings and the enclosure exit openings are provided in opposite enclosure end walls. Alternatively, either the enclosure entry openings or the enclosure exit openings can be provided in the front wall. In the embodiments depicted in FIGS. 2 and 9, the enclosure entry openings are provided in the front wall, while the enclosure exit openings are provided in the enclosure end wall. The location of the enclosure openings may depend on spatial constraints in the room in which the oven is installed.

Air from the area surrounding the oven enclosure, or room air, is drawn into the enclosure system through the enclosure entry and exit openings. The room air is mixed with the make-up air. The mixed air is circulated about the outer surfaces of the conveyor oven. Most preferably the mixed air is circulated about the top, ends and rear outer surfaces of the conveyor oven. The circulated air is then drawn across the rear oven wall back into the hood means through which the air is exhausted.

In accordance with the preferred embodiment of the present invention, enclosing all sides of a conveyor oven allows one to minimize the volume of room air that is drawn into the enclosure. Even though the volume of room air drawn into the enclosure can be minimized, it is preferred that a slight volume of air be drawn into the enclosure. Most preferably, the room air is directed into the enclosure through the enclosure entry and exit openings. A slight volume of room air is drawn into the enclosure system to aid in preventing the conveyor oven's exhausts of smoke and heat from entering into the area surrounding the enclosure system. Preferably between approximately 300 and approximately 450 cubic feet per minute of room air is drawn into the enclosure. More preferably less than 400 cubic feet per minute of room air is drawn into the enclosure system.

In accordance with the preferred embodiment of the present invention, make-up and exhaust fans in the hood are adjusted to intentionally create a slight negative pressure within the enclosure and ventilation system. Preferably, the slight negative pressure is created to ensure that a minimal amount of room air is drawn into the enclosure system. Most preferably, the slight negative pressure is created to ensure that a majority of the exhausts and heat fumes given off by the conveyor oven are contained rather than released into the area surrounding the enclosure system. In addition, the slight pressure difference between the exhaust air and supply air aids in removal of a minimal amount of room air, and in containing the oven's exhausts and heat fumes. Preferably the slight negative pressure causes air from the area surrounding the oven enclosure, or room air, to be drawn into the enclosure and ventilation system through the entry and exit openings.

Figure 2:
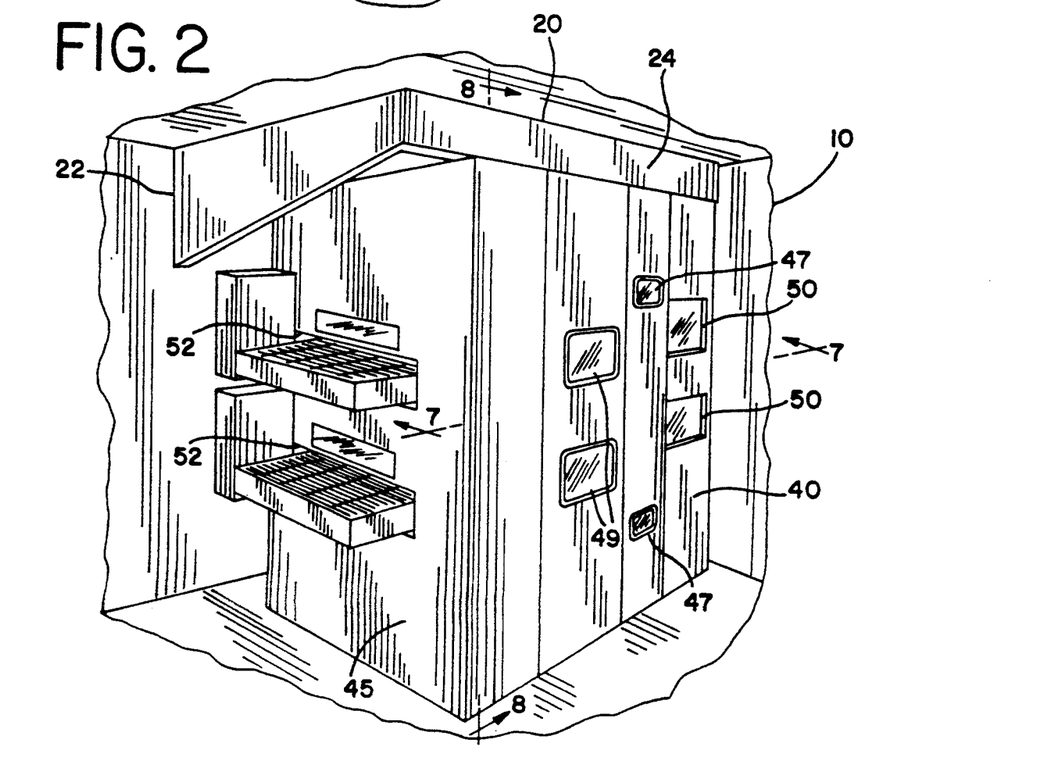
FIG. 2 is a perspective view of a preferred embodiment of the present invention.

Referring now to FIG. 2, a preferred embodiment of enclosure and ventilation system made in accordance with the present invention is shown.

The enclosure and ventilation system 10 encloses all sides of a conveyor over, such as the conveyor oven shown in FIG. 1. A hood means 20 extends over the conveyor oven. Preferably, the hood means 20 is fixed or bolted to the ceiling over the conveyor oven. The height of the hood means decreases from the rear 22 of the hood means 20 toward the front 24 of the hood means. Preferably, the height of the hood means decreases approximately by ⅔ of the total height of the hood means from the rear 22 of the hood means to the front 24 of the hood means. In the preferred embodiment illustrated in FIGS. 2 through FIG. 6, the height of the hood means decreases approximately 16 inches from the rear 22 of the hood means which is 24 inches in height to the front 24 of the hood means which is 8 inches in height.

Most preferably the hood means of the present invention is substantially the same as that sold by Greenheck Fan Corporation under the name GHAW Model with several modifications. One modification is that the height of the hood means is modified to decrease from the rear of the hood means to the front of the hood means. In addition, the manner of introducing make-up air into the hood means from make-up air fans and exhausting air from the hood means with exhaust fans is modified in accordance with the particular conveyor oven used, and with the spatial constraints in the room in which the oven is installed; meaning the position of the fans and the duct work to bring the air into and out of the hood means is modified and adjusted depending on the particular conveyor oven used, and the spatial constraints in the room in which the oven is installed. The length and width of the hood means is also dependent on the particular conveyor oven used. Preferably, the hood means extends beyond the edges of the conveyor oven walls and the conveyor belt of the oven. Most preferably, the GHAW Model selected is configured and sized to extend beyond the outer walls of the conveyor oven and the outermost edges of conveyor belt of the oven selected.

Figure 3:
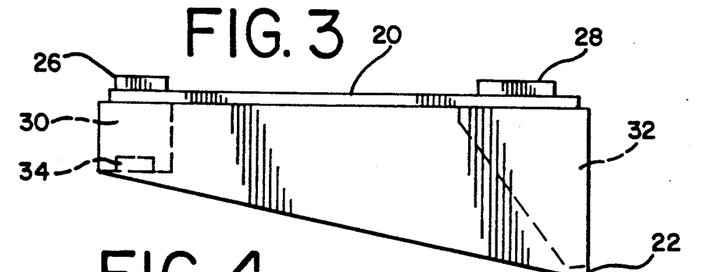
FIG. 3 is a side view of a preferred hood means made in accordance with the present invention.
Figure 4:
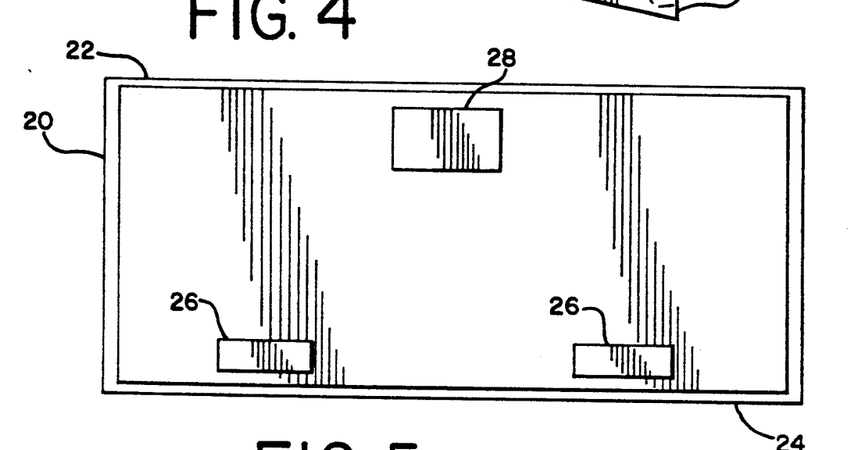
FIG. 4 is a top view of a preferred hood means made in accordance with the present invention.
Figure 5:
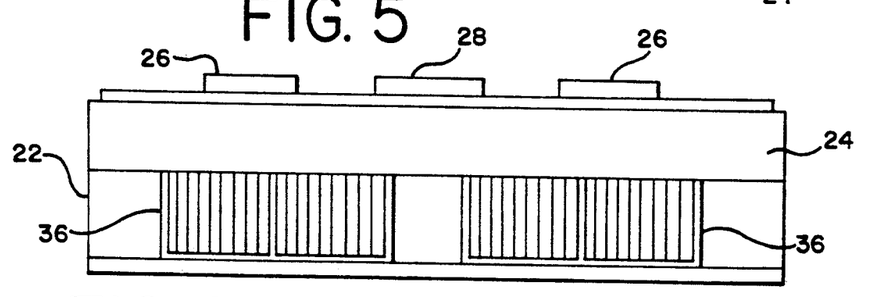
FIG. 5 is a front view of a preferred hood means made in accordance with the present invention.

Referring to FIGS. 3 through 6, generally the hood means 20 includes make-up and exhaust collars; exhaust filters; and make-up air and exhaust air plenums. Referring now to FIG. 3 and 4 a side view and top view of the hood means 20 is shown. At least one make-up collar 26 and exhaust collar 28 is included in a hood means 20 made in accordance with the present invention. Preferably, the make-up collar 26 is located toward the front of the hood means 20. Most preferably a plurality of make-up collars 26 are used. These makeup collars 26 are located opposite each other in the front of the hood means 20. Optionally, the positions of the make-up collars along the length of the front of the hood means may be varied according to particular building constraints in the ceiling above a conveyor oven. The make-up collars 26 permit air drawn in from the outside, or make-up air, to be projected in a make-up plenum 30. Preferably, the make-up collars 26 project the make-up air into a single make-up plenum 30 which is located in the front of the hood means 20. Preferably, the make-up plenum is sized to extend the length, from side to side, of the hood means 20.

Figure 6:
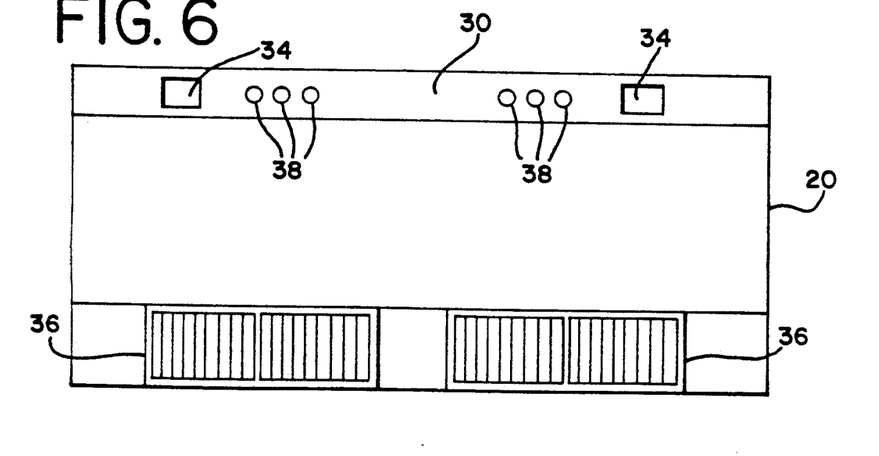
FIG. 6 is a bottom view of a preferred hood means made in accordance with the present invention.

Referring now to FIGS. 3 through 6, the make-up air is impelled into the enclosure system through at least one make-up register 34 in the make-up plenum 30. Preferably, a plurality of make-up registers 34 are included in the make-up plenum 30. Most preferably, the make-up registers 34 are located opposite each other (as shown in FIG. 6). Optionally, make-up air may be projected from the make-up plenum into the enclosure system through a combination of make-up registers and a series of apertures 38 located in the make-up air plenum 30.

In addition to a make-up air collar, at least one exhaust air collar is included in the hood means made in accordance with the present invention. Preferably, the exhaust air collar 28 is located toward the rear of the hood means 20. Most preferably, the exhaust air collar 28 is located in the rear center of the hood means 20, directly over the exhaust air plenum 32. Preferably, the exhaust air plenum extends the length of the hood means. Optionally, the position of the exhaust collar along the length of the rear of the hood means may be varied according to particular building constraints in the ceiling above a conveyor oven. The exhaust air collar aids in exhausting air from the enclosure system. Preferably, air that is to be exhausted from the enclosure system is first filtered through at least one exhaust filter 36 then projected into an exhaust air plenum 32. The exhaust air collar permits the exhaust air to be dispersed to the outside. Most preferably, a series of exhaust filters 36 are used. The exhaust filters 36 filter the make-up air and the room air that has been circulated heated within the enclosure system. The exhausted air is then drawn out of the exhaust-air plenum 32 through the exhaust collar 28 by an exhaust fan (not shown). Optionally, the intake fans and the exhaust fan circuitry is configured integral with the oven controls such that the hood fans must be on when the oven is on, and conversely the oven is turned off if a problem with any of the hood fans is detected.

Figure 8:
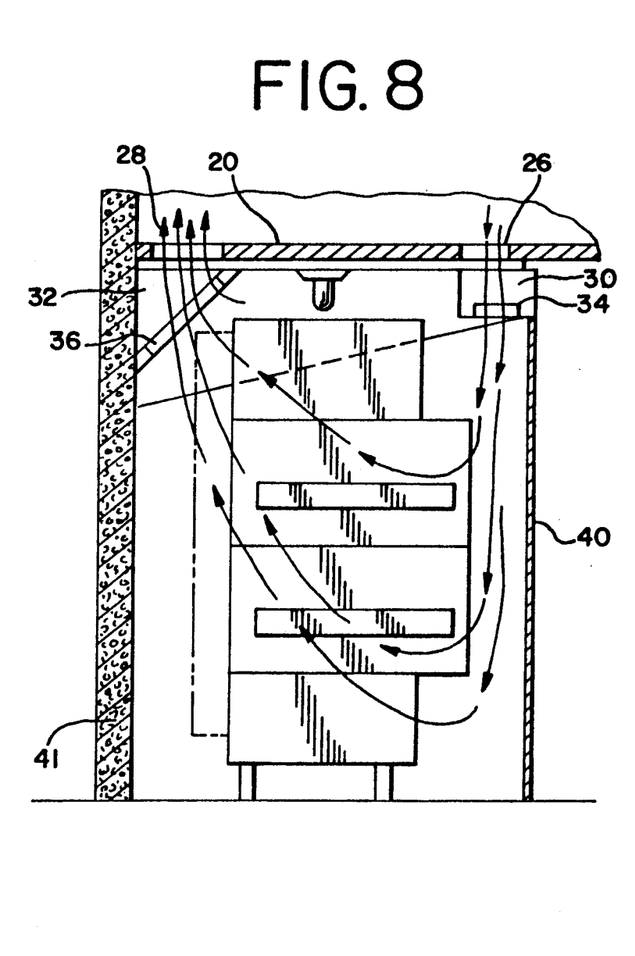
FIG. 8 is a cross-sectional view taken along line 8—8 of FIG. 2.

Referring again to FIG. 2, affixed to the hood means is a plurality of enclosure walls which extend vertically from the hood means 20 to the floor surrounding the conveyor oven. Preferably, a front enclosure wall 40 and rear enclosure wall (reference numeral 41 illustrated in 8) are affixed to the hood means 20 and are positioned parallel to and spaced apart from front and rear oven walls respectively. Preferably, the front enclosure wall 40 is formed of full length panels. A first enclosure end wall (not shown) is affixed to the hood means 20 and is positioned parallel to and spaced apart from a first oven end wall. A second enclosure end wall 45 is affixed to the hood means 20 and is positioned parallel to and spaced apart from a second oven end wall. Optionally, a free standing or store wall may be incorporated in the enclosure system as the rear enclosure wall. Preferably the enclosure walls are formed from stainless steel, plastic, or fabric with a cleanable reflective surface on the interior side of the enclosure wall.

Figure 12:
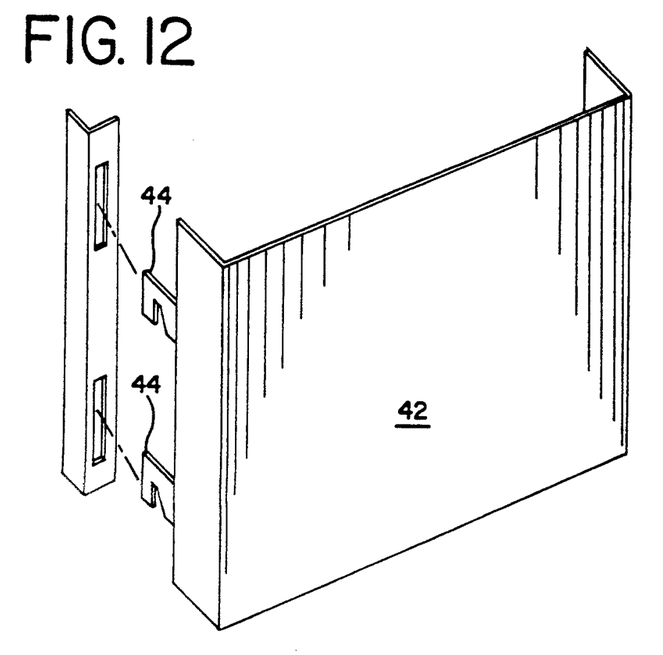
FIG. 12 is a perspective view of a removable panel made in accordance with the present invention.

Preferably, several of the enclosure walls are attached to the floor and hood while others are easily removable without tools. Preferably, several of the enclosure walls removably "drop-lock" into position to allow access to the oven for cleaning. Most preferably, the removable enclosure walls are configured to "hook" into place. (See FIG. 12). Illustrated in FIG. 12, is example of a removable panel 42 located in the front enclosure wall 40. The removable panel 42 is designed with "J" shaped hooks 44 which can be easily attached to and removed from adjacent enclosure walls.

At least one enclosure entry opening 50 is located on the front enclosure wall. In the preferred embodiment illustrated in FIG. 2, two enclosure entry openings 50 are located in parallel on the front enclosure wall 40. Each enclosure entry opening 50 is located to correspond with an oven entry opening (see FIG. 1) on the conveyor oven for inserting a food product onto a conveyor in the over. Alternatively, one enclosure entry opening can be provided of a size sufficient to allow access to both oven entry openings.

Additionally, located on the front enclosure wall is a plurality of access windows and doors. Preferably, at least one access window 47 is provided to view and/or adjust operating controls on the conveyor oven and to permit easy access to these controls. Preferably, at least one access door 49 is also included to permit easy access to each of the conveyor ovens. The access door 49 is provided to allow access to the center conveyor oven door and/or window for cleaning of, or repairs to the corresponding conveyor of the oven.

At least one enclosure exit opening 52 is located on the second enclosure end wall 45. In the preferred embodiment illustrated in FIG. 2, two enclosure exit openings 52 are located in parallel on the second enclosure end wall. Each enclosure exit opening 52 is positioned to correspond with an oven exit opening (see FIG. 1) on the conveyor oven from which a food product may be removed. Alternatively, one enclosure exit opening can be provided of a size sufficient to allow access to both oven exit openings.

In accordance with the preferred embodiment of the present invention, the conveyor belt of the conveyor oven protrudes a horizontal distance from the enclosure exit opening which is positioned to correspond with the conveyor oven's exit opening.

Figure 7:
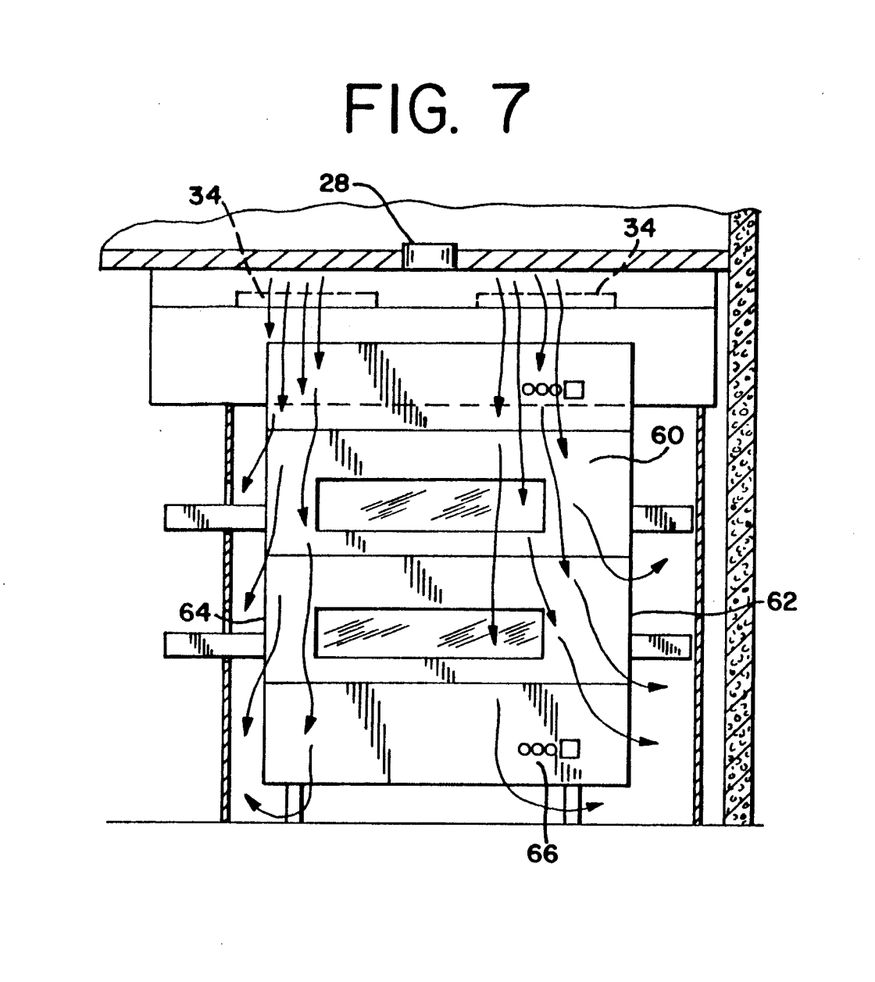
FIG. 7 is a cross-sectional view taken along line 7—7 of FIG. 2.

Referring now to FIG. 7 and FIG. 8, the air flow within an enclosure and ventilation system made in accordance with a preferred embodiment of the present invention is shown. Generally, untempered air, or make-up from outside is projected through at least one make-up air collar 26 into a make-up air plenum 30 located in the hood means 20. Preferably, there are two make-up air collars 26 located on opposite sides of the front 24 of the hood means through which outside air, or make-up air, is impelled into the make-up air plenum 30 by use of at least one make-up fan (not shown). Preferably the make-up air is dispersed from the make-up air plenum 30 into the enclosure system through make-up air registers 34. Optionally, the make-up air may be dispersed in the enclosure system through both make-up air registers 34 and a plurality of apertures located in the make-up air plenum. This make-up air is projected to sweep down over the front oven wall 60 and first and second oven end walls 62 and 64, respectively. Additionally, make-up air is projected over the top of the conveyor oven, under the conveyor oven and drawn up the rear oven wall. As the cooler make-up air contacts the oven walls the surface temperatures of these walls are consequently reduced.

In addition to the make-up air, air from the area surrounding the oven enclosure, or room air, is also drawn into the enclosure and ventilation system. The room air is drawn into the enclosure system through the enclosure entry 50 and enclosure exit 52 openings and is mixed with the make-up air. The room air is drawn into the enclosure system due to a slight negative pressure between the air in the area surrounding the enclosure system and the air within the enclosure system. Preferably, the slight negative pressure within the enclosure system is created by adjusting the make-up fan to operate at a slower rate than an exhaust fan which is located to exhaust air from the rear of the hood means. Preferably the exhaust fan (not shown) exhausts the heated makeup air, oven fumes, and smoke out the rear enclosure wall. As mentioned above, the amount of room air drawn into the enclosure system is preferably kept to a minimum. More preferably the amount of room air drawn into the enclosure is no more than that required to prevent oven exhausts, fumes, and smoke from entering the room.

Referring now to FIG. 8, the circulation pattern of the make-up air is shown. Preferably, make-up air is introduced into the enclosure system through the make-up plenum 30. The make-up air is swept across the front oven wall and the first and second oven end walls. A minimum volume of room air is drawn in from the area surrounding the enclosure system. The make-up air and room air are mixed. This mixed air is circulated about the conveyor oven and drawn upwards to the rear of the hood means by at least one exhaust fan (not shown). Preferably the heated makeup air and exhaust air is filtered through at least one exhaust filter 36 into an exhaust plenum 32 in the hood means; then exhausted through an exhaust collar 28 located in the rear of the hood means. Preferably the volume of room air drawn into the enclosure system between approximately 300 and approximately 450 cubic feet per minute. More preferably the volume of room air drawn into the enclosure and mixed with the make-up air is less than 400 cubic feet per minute.

In accordance with the preferred embodiment the air flow within the enclosure system effectively circulates around the exterior of the conveyor oven and removes smoke and heat from the work area. Preferably by enveloping all surfaces of the conveyor oven and circulating the makeup air within the enclosure system between approximately 85% and approximately 95% of the convected heat and between approximately 85% and approximately 95% of radiant heat given off by the conveyor oven is contained within the enclosure system and exhausted therefrom.

Figure 9:
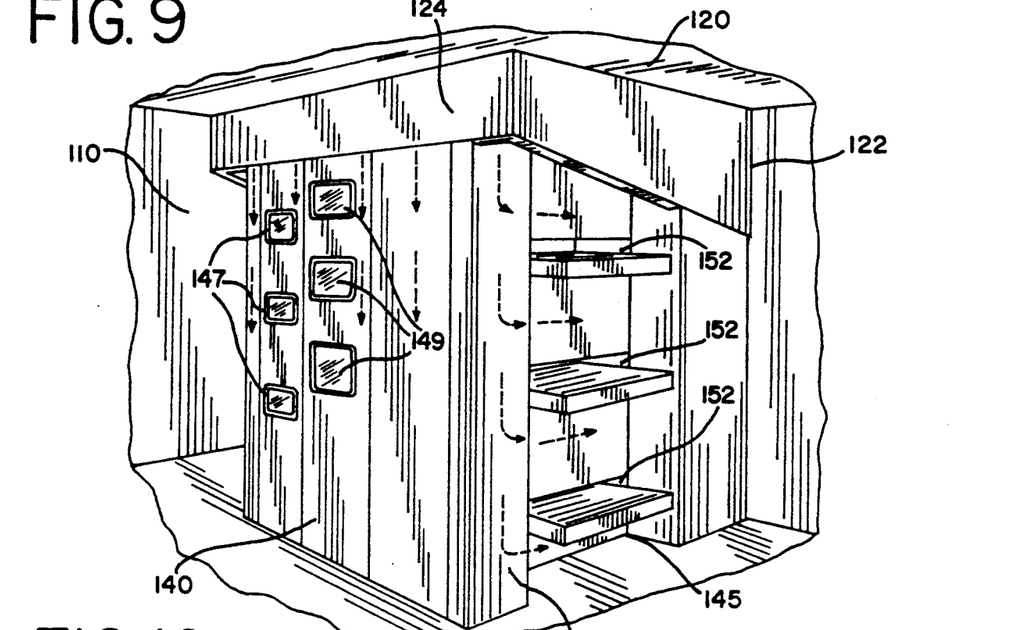
FIG. 9 is a perspective view of an alternative preferred embodiment of the present invention.

Referring now to FIGS. 9 through 11, and 13 through 14 an alternative preferred embodiment is shown. Most components of enclosure and ventilation system illustrated in FIG. 9 are substantially similar to components of the enclosure and ventilation system illustrated in FIG. 2. These components are denoted with the same reference numeral increased by a factor of 100. For example, the front 124 of the hood means 120 of the embodiment illustrated in FIG. 9 is substantially similar to the front 24 of the hood means 20 illustrated in FIG. 2.

Figure 13:
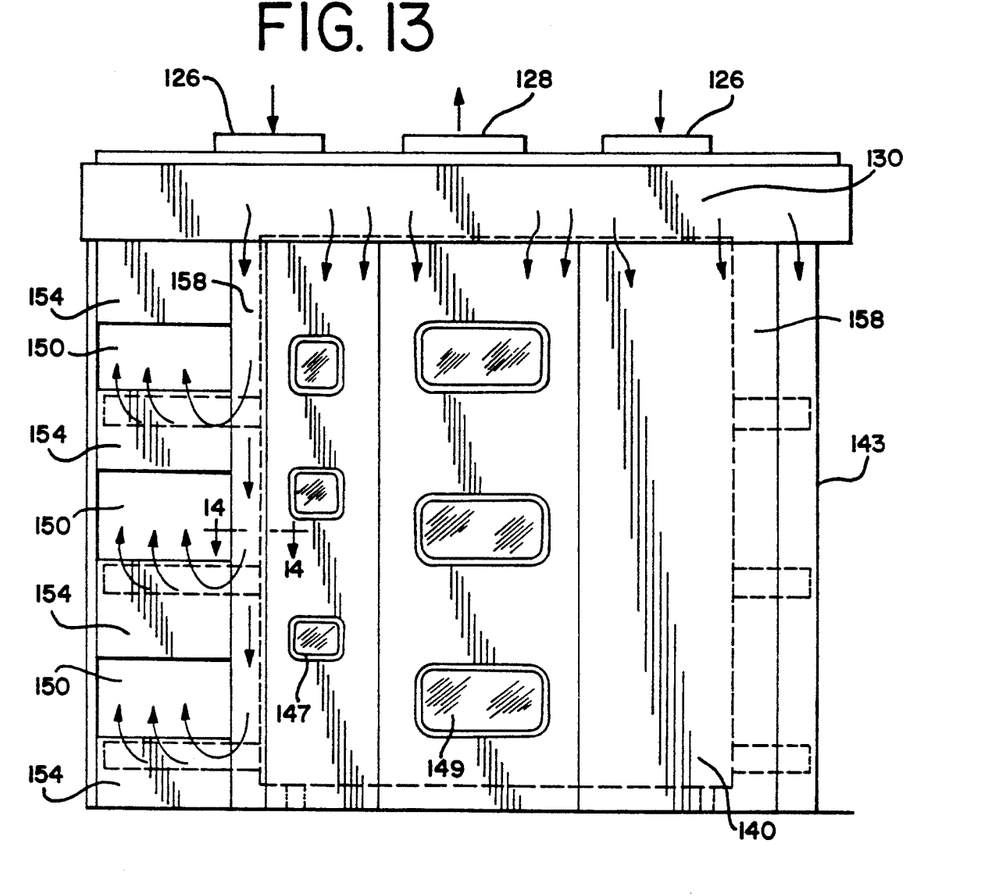
FIG. 13 is an illustration of the preferred air flow patterns produced in accordance with the preferred embodiment of the present invention.

In the preferred embodiment illustrated in FIGS. 9 and 13, the hood means 120 is substantially similar in design and function as that of the hood means 20 of FIG. 2.

In the preferred embodiment illustrated in FIGS. 9 and 13, three enclosure entry openings 150 are located in parallel on the front enclosure wall 140. Each enclosure entry opening 150 is located to correspond with an oven entry opening (not shown) on the conveyor oven for inserting a food product onto a conveyor in the oven.

In this preferred embodiment, at least one enclosure exit opening 152 is located on the second enclosure end wall 145. Most preferably, three enclosure exit openings 152 are located in parallel on the second enclosure end wall 145. Each enclosure exit opening 152 is positioned to correspond to an oven exit opening (see FIG. 1) on the conveyor oven from which food product may be removed from the conveyor oven.

Figure 10:
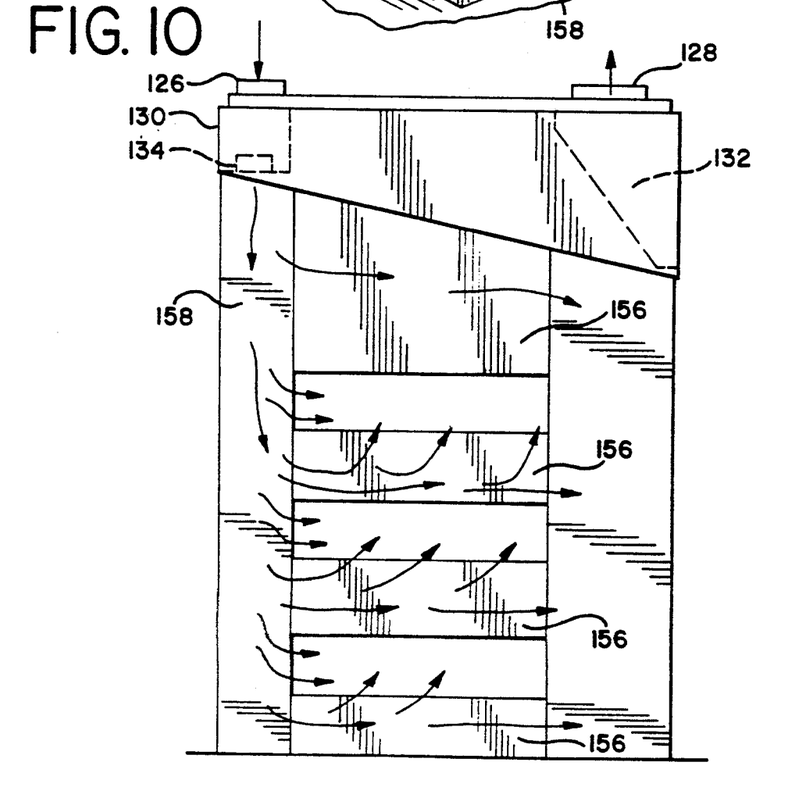
FIG. 10 is a side view of the enclosure exit openings of a preferred embodiment of the present invention.
Figure 11:
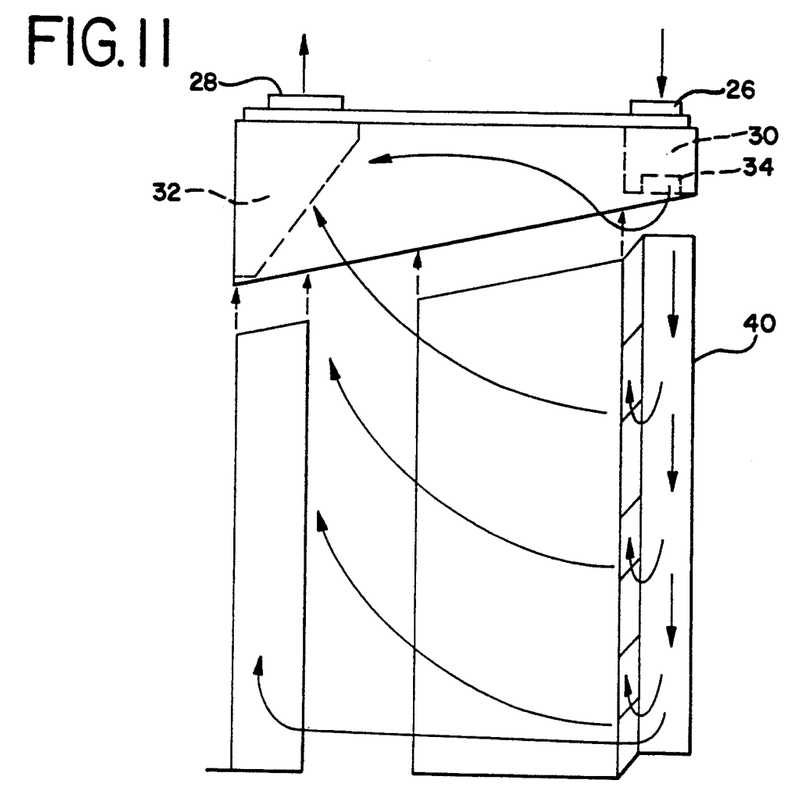
FIG. 11 is an exploded side view of the enclosure entry openings of a preferred embodiment of the present invention.

Referring now to FIGS. 10, 11 and 13, in this preferred embodiment the air flow within the enclosure and ventilation system is substantially similar to the air flow discussed in the previous embodiment. Generally, untempered, or makeup air from outside is projected through at least one make-up air collar into the make-up air plenum in the hood means and projected over the front oven walls and the first and second oven end walls in a manner substantially similar to that discussed in the previous embodiment. The make-up air is mixed with room air and circulated within the enclosure system in substantially the same manner as previously describe. However, in this preferred embodiment the enclosure entry opening and the enclosure exit opening are formed from a series of panels 154 and 156 respectively which are vertically spaced. Each panel is formed with a hollow channel which permits makeup air to be projected through the panel. More preferably a vertical duct 158 is located in the enclosure walls adjacent the enclosure entry and exit panels, and is configured with apertures through which makeup may be impelled into the panels. Most preferably the panels are configured to include apertures through which makeup air that is impelled into the panel through the duct may be projected through the panel and out the apertures in panel across the respective enclosure entry opening or exit opening. Optionally, the series of panels 154 forming the enclosure entry openings are recessed from the panels which form the front enclosure wall 140.

Figure 14:
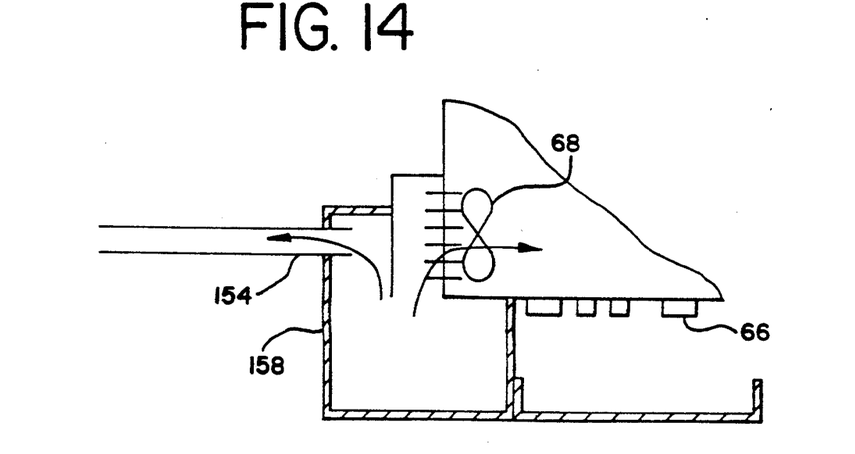
FIG. 14 is a cross-sectional view taken along line 14—14 in FIG. 13.

Referring now to FIG. 14, in accordance with this preferred embodiment room air and make-up air that is projected through the vertical duct 158 is also projected across the controls of the conveyor oven and is ducted to cooling fans 68 built into the conveyor ovens to maintain the control compartment of the conveyor oven at temperatures below the manufacturer's recommended temperatures. Preferably, the vertical duct is configured such that an opening extends the length of the back of the duct which permits a volume of make-up air to be impelled out the opening and across the oven controls 66.

In accordance with yet another preferred embodiment, the conveyor oven and enclosure system are designed and manufactured as a single unit. In particular, the controls for the oven and the controls for the enclosure are integrated, to provide, for example, circuitry whereby the hood fans must be on when the oven is on, and conversely whereby the oven is turned off if a problem with the hood fans is detected. Also, in this embodiment, the hood, the walls of the oven, and the walls of the enclosure are configured in such a way so as to provide for maximum efficiency in material usage, as well as to provide for optimum air flow through the enclosure.

The foregoing description of the preferred embodiments of the present invention has been presented for purposes of illustration and description. They are not intended to be exhaustive or to limit the invention to the precise forms disclosed, and obviously many modifications and variations are possible in light of the above teachings. These embodiments were chosen and described in order to best explain the principles of the invention and various embodiments and with various modifications as are suited to the particular use contemplated. It is intended that the scope of the invention be defined by the following claims, including all equivalents.

I claim:

1. An enclosure and ventilation system for a conveyor oven, said oven having a front, and rear oven wall, and a first and second oven end wall; said oven having at least one oven entry opening for inserting food products onto a conveyor in one of said oven walls, and at least one oven exit opening for removing food products from the conveyor in one of said oven walls; said enclosure system comprising:
   hood means for supplying intake air and exhausting heated air, said hood means extending over said conveyor oven;
   front enclosure and rear enclosure walls parallel to and spaced apart from the front and rear oven walls of the oven respectively;
   a first enclosure end wall parallel to and spaced apart from the first oven end wall; and
   a second enclosure end wall parallel to and spaced apart from the second oven end wall;
   an enclosure entry opening in at least one of said enclosure walls corresponding to each oven entry opening, each of said enclosure entry openings being formed of a plurality of panels which are spaced apart vertically;
   an enclosure exit opening in at least one of said enclosure walls corresponding to each oven exit opening;
   wherein the hood means, front enclosure wall, rear enclosure wall, first enclosure end wall, and second enclosure end wall are configured such that at least a portion of the intake air passes over the front oven wall, rear oven wall, first oven end wall, and second oven end wall before being exhausted by the hood means.

2. An enclosure and ventilation system for a conveyor oven, said oven having a front, and rear oven wall, and a first and second oven end wall; said oven having at least one oven entry opening for inserting food products onto a conveyor in one of said oven walls, and at least one oven exit opening for removing food products from the conveyor in one of said oven walls; said enclosure system comprising:
   hood means for supplying intake air and exhausting heated air, said hood means extending over said conveyor oven;
   front enclosure and rear enclosure walls parallel to and spaced apart from the front and rear oven walls of the oven respectively;
   a first enclosure end wall parallel to and spaced apart from the first oven end wall; and
   a second enclosure end wall parallel to and spaced apart from the second oven end wall;
   an enclosure entry opening in at least one of said enclosure walls corresponding to each oven entry opening;
   an enclosure exit opening in at least one of said enclosure walls corresponding to each oven exit opening, each of said enclosure exit openings being formed of a plurality of panels which are spaced apart vertically;
   wherein the hood means, front enclosure wall, rear enclosure wall, first enclosure end wall, and second enclosure end wall are configured such that at least a portion of the intake air passes over the front oven wall, rear oven wall, first oven end wall, and second oven end wall before being exhausted by the hood means.

3. An enclosure and ventilation system for a conveyor oven, said oven having a front, and rear oven wall, and a first and second oven end wall; said oven having at least one oven entry opening for inserting food products onto a conveyor in one of said oven walls, and at least one oven exit opening for removing food products from the conveyor in one of said oven walls; said enclosure system comprising:
   hood means for supplying intake air and exhausting heated air, said hood means extending over said conveyor oven;
   front enclosure and rear enclosure walls parallel to and spaced apart from the front and rear oven walls of the oven respectively;
   a first enclosure end wall parallel to and spaced apart from the first oven end wall; and
   a second enclosure end wall parallel to and spaced apart from the second oven end wall;
   an unobstructed enclosure entry opening in at least one of said enclosure walls corresponding to each oven entry opening;
   at least one first channel adapted to pass air through, said channel being adjacent to at least one of said enclosure entry openings;
   an unobstructed enclosure exit opening in at least one of said enclosure walls corresponding to each oven exit opening;
   wherein the hood means, front enclosure wall, rear enclosure wall, first enclosure end wall, and second enclosure end wall are configured such that at least a portion of the intake air passes over the front oven wall, rear oven wall, first oven end wall, and second oven end wall before being exhausted by the hood means.

4. An enclosure and ventilation system for a conveyor oven, said oven having a front, and rear oven wall, and a first and second oven end wall; said oven having at least one oven entry opening for inserting food products onto a conveyor in one of said oven walls, and at least one oven exit opening for removing food products from the conveyor in one of said oven walls; said enclosure system comprising:
   hood means for supplying intake air and exhausting heated air, said hood means extending over said conveyor oven;
   front enclosure and rear enclosure walls parallel to and spaced apart from the front and rear oven walls of the oven respectively;
   a first enclosure end wall parallel to and spaced apart from the first oven end wall; and a second enclosure end wall parallel to and spaced apart from the second oven end wall;

an unobstructed enclosure entry opening in at least one of said enclosure walls corresponding to each oven entry opening;

an unobstructed enclosure exit opening in at least one of said enclosure walls corresponding to each oven exit opening;

at least one first channel adapted to pass air through, said channel being adjacent to at least one of said enclosure exit openings;

wherein the hood means, front enclosure wall, rear enclosure wall, first enclosure end wall and second enclosure end wall are configured such that at least a portion of the intake air passes over the front oven wall, rear oven wall, first oven end wall, and second oven end wall before being exhausted by the hood means.

5. The enclosure system of claim 1, 2, 3, or 4 wherein each oven entry opening is located in the first oven end wall, and each enclosure entry opening is located in said first enclosure end wall to correspond with each oven entry opening.

6. The enclosure system of claim 5 wherein each oven exit opening is located in the second oven end wall, and each enclosure exit opening is located in said second enclosure end wall to correspond with each oven exit opening.

7. The enclosure system of claim 5 wherein each oven exit opening is located in the second oven end wall, and each enclosure exit opening is located in said front enclosure wall to correspond with each oven exit opening.

8. The enclosure system of claim 1, 2, 3, or 4 wherein each oven entry opening is located in the first oven end wall, and each enclosure entry opening is located in said front enclosure wall to correspond with each oven entry opening.

9. The enclosure system of claim 8 wherein each oven exit opening is located in the second oven end wall, and each enclosure exit opening is located in said second enclosure end wall to correspond with each oven exit opening.

10. The enclosure system of claim 8 wherein each oven exit opening is located in the second oven end wall, and each enclosure exit opening is located in said front enclosure wall to correspond with each oven exit opening.

11. The enclosure system of claim 1, 2, 3, or 4 wherein each oven exit opening is located in the second oven end wall, and each enclosure exit opening is located in said second enclosure end wall to correspond with each oven entry opening.

12. The enclosure system of claim 1, 2, 3, or 4 wherein each oven exit opening is located in the second oven end wall, and each enclosure exit opening is located in said front enclosure wall to correspond with each oven exit opening.

13. The enclosure system of claim 1, 2, 3, or 4 wherein the hood means includes at least one supply air plenum and at least one exhaust air plenum.

14. The enclosure system of claim 1, 2, 3, or 4 wherein the hood means includes a plurality of supply air plenums, said supply air plenums project intake air between said front, rear and side oven walls and said front, rear, and side enclosure walls.

15. The enclosure system of claim 1, 2, 3, or 4 wherein the hood means is adapted to project intake air across the front of said oven and withdraw exhaust air from the rear of the oven 16. The enclosure system of claim 1, 2, 3, or 4 wherein the hood means includes at least one intake fan and one exhaust fan.

17. The enclosure system of claim 16 wherein a power source of both fans is coupled to the operating controls of the oven such that both fans operate when the oven is operating.

18. The enclosure system of claim 1, 2, 3, or 4 wherein the hood means includes at least one exhaust filter.

19. The enclosure system of claim 1, 2, 3, or 4 wherein the exhaust air is made up of less than 450 cubic feet per minute of room air.

20. The enclosure system of claim 1, 2, 3, or 4 wherein access panels are provided in at least one enclosure wall which correspond to operating controls of said oven.

21. The enclosure system of claim 1, 2, 3, or 4 wherein operating controls of the oven are located on one of the enclosure walls.

22. The enclosure system of claim 1, 2, 3, or 4 wherein said front enclosure wall is configured to have a recessed portion in which each enclosure exit opening is located.

23. The enclosure system of claim 1, 2, 3, or 4 wherein said front enclosure wall is configured to have a recessed portion in which each enclosure exit opening is located.

24. An enclosure and ventilation system for a conveyor oven, said oven having a front, and rear oven wall, and a first and second oven end wall; said oven having at least one oven entry opening for inserting food products onto a conveyor in one of said oven walls, and at least one oven exit opening for removing food products from the conveyor one of said oven walls; said enclosure system comprising:

hood means for supplying intake air and exhausting heated air, said hood means extending over said conveyor oven and including at least one supply air plenum and at least one exhaust air plenum;

front enclosure and rear enclosure walls parallel to and spaced apart from the front and rear oven walls of the oven respectively;

a first enclosure end wall parallel to and spaced apart from the first oven end wall, said first enclosure end wall being formed from a plurality of removable panels which are spaced apart vertically;

a second enclosure end wall parallel to and spaced apart from the second oven end wall, said second enclosure end wall being formed from a plurality of removable panels which are spaced apart vertically;

an enclosure entry opening in at least one of said enclosure walls corresponding to each oven entry opening, said enclosure entry opening being formed of a plurality of panels which are spaced apart vertically, each of said panels having a channel through which air may be passed;

an enclosure exit opening in at least one of said enclosure walls corresponding to each oven exit opening, said enclosure exit opening being formed of a plurality of panels which are spaced apart vertically, each of said panels having a channel through which air may be passed;

wherein the hood means, front enclosure wall, rear enclosure wall, first enclosure end wall, and second enclosure end wall are configured such that at least a portion of the intake air passes over the front oven wall, rear oven wall, first oven end wall, and second oven end wall before being exhausted by the hood means.

25. An enclosure and ventilation system for a conveyor oven, said oven having a front, and rear oven wall, and a first and second oven end wall; said oven having at least one oven entry opening for inserting food products onto a conveyor in one of said oven walls, and at least one oven exit opening for removing food products from the conveyor one of said oven walls; said enclosure system comprising:
hood means for supplying intake air and exhausting heated air, said hood means extending over said conveyor oven;
front enclosure and rear enclosure walls parallel to and spaced apart from the front and rear oven walls of the oven respectively;
a first enclosure end wall parallel to and spaced apart from the first oven end wall; and
a second enclosure end wall parallel to and spaced apart from the second oven end wall;
an enclosure entry opening in at least one of said enclosure walls corresponding to each oven entry opening, each of said enclosure entry openings being formed of a plurality of panels which are spaced apart vertically, each of said panels having a channel through which air may be passed;
an enclosure exit opening in at least one of said enclosure walls corresponding to each oven exit opening;
wherein the hood means, front enclosure wall, rear enclosure wall, first enclosure end wall, and second enclosure end wall are configured such that at least a portion of the intake air passes over the front oven wall, rear oven wall, first oven end wall, and second oven end wall before being exhausted by the hood means.

26. An enclosure and ventilation system for a conveyor oven, said oven having a front, and rear oven wall, and a first and second oven end wall; said oven having at least one oven entry opening for inserting food products onto a conveyor in one of said oven walls, and at least one oven exit opening for removing food products from the conveyor in one of said oven walls; said enclosure system comprising:
hood means for supplying intake air and exhausting heated air, said hood means extending over said conveyor oven;
front enclosure and rear enclosure walls parallel to and spaced apart from the front and rear oven walls of the oven respectively;
a first enclosure end wall parallel to and spaced apart from the first oven end wall; and
a second enclosure end wall parallel to and spaced apart from the second oven end wall;
an enclosure entry opening in at least one of said enclosure walls corresponding to each oven entry opening, each of said enclosure entry openings being formed of a plurality of panels which are spaced apart vertically, each of said panels having a channel through which air may be passed;
a vertical duct, said vertical duct being located adjacent said plurality of panels, said vertical duct configured to permit air to be passed through the vertical duct into and through said panels;
an enclosure exit opening in at least one of said enclosure walls corresponding to each oven exit opening;

wherein the hood means, front enclosure wall, rear enclosure wall, first enclosure end wall, and second enclosure end wall are configured such that at least a portion of the intake air passes over the front oven wall, rear oven wall, first oven end wall, and second oven end wall before being exhausted by the hood means.

27. An enclosure and ventilation system for a conveyor oven, said oven having a front, and rear oven wall, and a first and second oven end wall; said oven having at least one oven entry opening for inserting food products onto a conveyor in one of said oven walls, and at least one oven exit opening for removing food products from the conveyor in one of said oven walls; said enclosure system comprising:
hood means for supplying intake air and exhausting heated air, said hood means extending over said conveyor oven;
front enclosure and rear enclosure walls parallel to and spaced apart from the front and rear oven walls of the oven respectively;
a first enclosure end wall parallel to and spaced apart from the first oven end wall; and
a second enclosure end wall parallel to and spaced apart from the second oven end wall;
an enclosure entry opening in at least one of said enclosure walls corresponding to each oven entry opening, each of said enclosure entry openings being formed of a plurality of panels which are spaced apart vertically, each of said panels having a channel through which air may be passed, each of said panels having a plurality of apertures through which air is passed out said apertures and across each of said enclosure entry openings;
a vertical duct, said vertical duct being located adjacent said plurality of panels, said vertical duct configured to permit air to be passed through the vertical duct into and through said panels;
an enclosure exit opening in at least one of said enclosure walls corresponding to each oven exit opening;
wherein the hood means, front enclosure wall, rear enclosure wall, first enclosure end wall, and second enclosure end wall are configured such that at least a portion of the intake air passes over the front oven wall, rear oven wall, first oven end wall, and second oven end wall before being exhausted by the hood means.

28. An enclosure and ventilation system for a conveyor oven, said oven having a front, and rear oven wall, and a first and second oven end wall; said oven having at least one oven entry opening for inserting food products onto a conveyor in one of said oven walls, and at least one oven exit opening for removing food products from the conveyor in one of said oven walls; said enclosure system comprising:
hood means for supplying intake air and exhausting heated air, said hood means extending over said conveyor oven;
front enclosure and rear enclosure walls parallel to and spaced apart from the front and rear oven walls of the oven respectively;
a first enclosure end wall parallel to and spaced apart from the first oven end wall; and
a second enclosure end wall parallel to and spaced apart from the second oven end wall;

an enclosure entry opening in at least one of said enclosure walls corresponding to each oven entry opening;

an enclosure exit opening in at least one of said enclosure walls corresponding to each oven exit opening, each of said enclosure exit openings being formed of a plurality of panels which are spaced apart vertically, each of said panels having a channel through which air may be passed;

wherein the hood means, front enclosure wall, rear enclosure wall, first enclosure end wall, and second enclosure end wall are configured such that at least a portion of the intake air passes over the front oven wall, rear oven wall, first oven end wall, and second oven end wall before being exhausted by the hood means.

29. An enclosure and ventilation system for a conveyor oven, said oven having a front, and rear oven wall, and a first and second oven end wall; said oven having at least one oven entry opening for inserting food products onto a conveyor in one of said oven walls, and at least one oven exit opening for removing food products from the conveyor in one of said oven walls; said enclosure system comprising:

hood means for supplying intake air and exhausting heated air, said hood means extending over said conveyor oven;

front enclosure and rear enclosure walls parallel to and spaced apart from the front and rear oven walls of the oven respectively;

a first enclosure end wall parallel to and spaced apart from the first oven end wall; and a second enclosure end wall parallel to and spaced apart from the second oven end wall;

an enclosure entry opening in at least one of said enclosure walls corresponding to each oven entry opening;

an enclosure exit opening in at least one of said enclosure walls corresponding to each oven exit opening, each of said enclosure exit openings being formed of a plurality of panels which are spaced apart vertically, each of said panels having a channel through which air may be passed;

a vertical duct, said vertical duct being located adjacent said plurality of panels, said vertical duct configured to permit air to be passed through the vertical duct into and through said panels;

wherein the hood means, front enclosure wall, rear enclosure wall, first enclosure end wall, and second enclosure end wall are configured such that at least a portion of the intake air passes over the front oven wall, rear oven wall, first oven end wall, and second oven end wall before being exhausted by the hood means.

30. An enclosure and ventilation system for a conveyor oven, said oven having a front, and rear oven wall, and a first and second oven end wall; said oven having at least one oven entry opening for inserting food products onto a conveyor in one of said oven walls, and at least one oven exit opening for removing food products from the conveyor in one of said oven walls; said enclosure system comprising:

hood means for supplying intake air and exhausting heated air, said hood means extending over said conveyor oven;

front enclosure and rear enclosure walls parallel to and spaced apart from the front and rear oven walls of the oven respectively;

a first enclosure end wall parallel to and spaced apart from the first oven end wall; and a second enclosure end wall parallel to and spaced apart from the second oven end wall;

an enclosure entry opening in at least one of said enclosure walls corresponding to each oven entry opening;

an enclosure exit opening in at least one of said enclosure walls corresponding to each oven exit opening, each of said enclosure exit openings being formed of a plurality of panels which are spaced apart vertically, each of said panels having a channel through which air may be passed, each of said panels having a plurality of apertures through which air is passed out said apertures and across each of said enclosure exit openings;

a vertical duct, said vertical duct being located adjacent said plurality of panels, said vertical duct configured to permit air to be passed through the vertical duct into and through said panels;

wherein the hood means, front enclosure wall, rear enclosure wall, first enclosure end wall, and second enclosure end wall are configured such that at least a portion of the intake air passes over the front oven wall, rear oven wall, first oven end wall, and second oven end wall before being exhausted by the hood means.

31. The system of claim 3 further comprising at least one aperture in the first channel through which air is directed out of said channel and across said enclosure entry opening.

32. The system of claim 31 further comprising a vertical air duct communicating with the first channel.

33. The system of claim 29, 31, or 32 further comprising at least one second channel adapted to pass air through, said channel being adjacent to at least one of said exit openings.

34. The system of claim 33 further comprising at least one aperture in the second channel through which air is directed out of said channel and across said exit opening.

35. The system of claim 34 further comprising a vertical air duct communicating with the second channel.

36. The system of claim 4 further comprising at least one aperture in the first channel through which air is directed out of said channel and across said enclosure exit opening.

37. The system of claim 36 further comprising a vertical air duct communicating with the first channel.

* * * * *